(12) United States Patent
Iovanna et al.

(10) Patent No.: US 10,153,862 B2
(45) Date of Patent: Dec. 11, 2018

(54) SYSTEM AND METHOD FOR A RADIO ACCESS NETWORK

(71) Applicant: TELEFONAKTIEBOLAGET LM ERICSSON (PUBL), Stockholm (SE)

(72) Inventors: Paola Iovanna, Pisa (IT); Fabio Cavaliere, Pisa (IT); Roberto Sabella, Pisa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/577,430

(22) PCT Filed: Jun. 12, 2015

(86) PCT No.: PCT/EP2015/063239
§ 371 (c)(1),
(2) Date: Nov. 28, 2017

(87) PCT Pub. No.: WO2016/198127
PCT Pub. Date: Dec. 15, 2016

(65) Prior Publication Data
US 2018/0152261 A1    May 31, 2018

(51) Int. Cl.
*H04B 10/40* (2013.01)
*H04B 10/50* (2013.01)
(Continued)

(52) U.S. Cl.
CPC ...... *H04J 14/0278* (2013.01); *H04J 14/0227* (2013.01); *H04L 25/00* (2013.01);
(Continued)

(58) Field of Classification Search
None
See application file for complete search history.

(56) References Cited

U.S. PATENT DOCUMENTS 8,989,257 B1 * 3/2015 Akhter ............... H03M 7/3059
                                                        375/240
9,215,296 B1 * 12/2015 Akhter .................. H04L 69/04
(Continued)

FOREIGN PATENT DOCUMENTS

| EP | 2 456 260 A2 | 5/2012 |
|---|---|---|
| EP | 2 525 623 A2 | 11/2012 |
| EP | 2 574 138 A1 | 3/2013 |
| WO | 2013/048526 A1 | 4/2013 |

OTHER PUBLICATIONS

A. Pizzinat et al., "Things You Should Know About Fronthaul", ECOC 2014, Cannes, France, pp. 1-3.
(Continued)

*Primary Examiner* — Darren E Wolf
(74) *Attorney, Agent, or Firm* — Patent Portfolio Builders PLLC

(57) ABSTRACT

A radio manager unit for a radio access network, wherein the radio manager unit is configured to connect to a transport control unit configured to control a transport network between a baseband processing unit and a plurality of remote radio units. The radio manager unit is further configured to connect to a radio control unit configured to control the baseband processing unit. The radio manager unit is further configured to be connected to one or more tenant system of a tenant. The radio manager unit is configured to arrange for resources of the transport network and resources of the baseband processing unit to be configured for use by a said tenant.

18 Claims, 5 Drawing Sheets

(51) Int. Cl.
- *H04B 10/60* (2013.01)
- *H04J 14/02* (2006.01)
- *H04Q 11/00* (2006.01)
- *H04L 25/00* (2006.01)
- *H04W 28/16* (2009.01)
- *H04W 72/04* (2009.01)
- *H04W 88/08* (2009.01)

(52) U.S. Cl.
CPC ..... *H04Q 11/0005* (2013.01); *H04Q 11/0062* (2013.01); *H04W 28/16* (2013.01); *H04W 72/0413* (2013.01); *H04B 10/40* (2013.01); *H04B 10/50* (2013.01); *H04B 10/60* (2013.01); *H04Q 2011/0016* (2013.01); *H04Q 2011/0086* (2013.01); *H04W 88/085* (2013.01)

(56) References Cited

U.S. PATENT DOCUMENTS

| | | |
|---|---|---|
| 2012/0236774 A1 | 9/2012 | Guey et al. |
| 2013/0303216 A1* | 11/2013 | Teng ............... H01Q 1/246 |
| | | 455/501 |
| 2014/0025816 A1 | 1/2014 | Otani |

OTHER PUBLICATIONS

N. Carapellese et al., "An Energy Consumption Comparison of Different Mobile Backhaul and Fronthaul Optical Access Architectures", ECOC 2014, Cannes, France, pp. 1-3.

International Search Report and Written Opinion, dated Mar. 8, 2016, from corresponding PCT Application No. PCT/EP2015/063239.

* cited by examiner

SYSTEM AND METHOD FOR A RADIO ACCESS NETWORK

TECHNICAL FIELD

Embodiments herein relate to a system for a radio access network radio access network and a method of operating a system in a radio access network.

BACKGROUND

In today's radio transport networks a number of different technologies are used, such as Long Term Evolution (LTE), LTE-Advanced, 3rd Generation Partnership Project (3GPP) Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. A radio transport network comprises Radio Base Stations (RBS) providing radio coverage over at least one respective geographical area forming a cell. The cell definition may also incorporate frequency bands used for transmissions, which means that two different cells may cover the same geographical area but using different frequency bands. User equipments (UE) are served in the cells by the respective radio base station and are communicating with respective radio base station. The user equipments transmit data over an air or radio interface to the radio base stations in uplink (UL) transmissions and the radio base stations transmit data over an air or radio interface to the user equipments in downlink (DL) transmissions.

In some RBS implementations a radio unit and a baseband processing equipment (digital unit (DU)) of the RBS are combined. In other implementations, the radio unit and DU are separated. In some examples, the radio unit and baseband processing equipment is split in two different locations. In this case, the radio unit is remote and termed a remote radio unit (RRU). As such, the system separates a RBS into one or more DU and RRUs. The radio unit creates the analog transmit RF signal from the baseband signal and provides the RF signal to an antenna. The radio unit correspondingly digitizes an RF receive signal.

The DU and RRU are connected via e.g. an optical network. The one or more DUs may be centralized and located remotely, for example a few kilometers from the RRUs. The RRUs are placed close to the radio antennas, e.g. in antenna masts. This minimizes feeder and jumper losses between antenna and RRUs, which is often a major challenge to address in most radio transport networks, for example, to enhance the uplink capacity of mobile services. The signal processing is centralized in a DU, which offers processing resources for multiple cells, each covered by an antenna driven by a RRU. This allows a pool of processing resources to be dynamically shared among many cells, in line with the cloud computing principle, saving energy, improving the radio link reliability and decreasing number and size of access sites.

A Common Public Radio Interface (CPRI) specifies a Time Division Multiplexing (TDM) like protocol for RBS configurations in a system configured for RRUs and DUs over a first layer. CPRI defines a protocol which is used to connect a DU and RRU. The application of CPRI between the DUs and the RRUs is static, i.e. determined as the RBS is deployed, and its configuration is only changed as part of a predetermined topology involving the DUs and RRUs.

The centralization of baseband processing functions in the Radio Access Network (RAN) is useful to improve coordination between base stations, and allows simplification and a reduction in the management costs of the network. A centralized RAN (CRAN) may benefit from the flexibility of an underlying optical fronthaul network, able to dispatch in a reconfigurable way control data flows (e.g. over CPRI) between RRUs and DUs.

In some circumstances, there is a need to open the optical fronthaul network to multiple tenants/operators. An effective system and method for opening the optical fronthaul network to multiple operators is required.

SUMMARY

In a first aspect of the invention, there is provided a radio manager unit for a radio access network, wherein the radio manager unit is configured to connect to a transport control unit configured to control a transport network between a baseband processing unit and a plurality of remote radio units. The radio manager unit is further configured to connect to a radio control unit configured to control the baseband processing unit. The radio manager unit is further configured to be connected to one or more tenant system of a tenant. The radio manager unit is configured to arrange for resources of the transport network and resources of the baseband processing unit to be configured for use by a said tenant.

Thus, the tenant is efficiently allocated resources in a fronthaul transport network and baseband processing resources.

In a second aspect of the invention, there is provided a system for a radio access network. The system comprises a transport control unit configured to control a transport network between a baseband processing unit and a plurality of remote radio units. The system further comprises a radio control unit configured to control the baseband processing unit. The system further comprises a radio manager unit connected to the transport control unit and radio control unit. The radio manager unit is configured to be connected to one or more tenant system of a tenant. The radio manager unit is configured to arrange for resources of the transport network and resources of the baseband processing unit to be configured for use by a said tenant.

In a third aspect of the invention, there is provided a method for a radio manager unit in a radio access network, comprising communicating with a tenant system of a tenant to determine resources of a transport network and/or resources of a baseband processing unit for use by the tenant. The method further comprises communicating with a transport control unit controlling a transport network between a baseband processing unit and a plurality of remote radio units. The method further comprises communicating with a radio control unit controlling a baseband processing unit. The communicating with the transport control unit and the radio control unit arranges for the determined resources of the transport network and the baseband processing unit to be configured for use by the said tenant.

In a fourth aspect of the invention, there is provided a computer program product configured to implement the method of any example of the invention.

BRIEF DESCRIPTION OF THE DRAWINGS

Embodiments will now be described by way of example only in relation to the enclosed drawings, in which.

DETAILED DESCRIPTION

Aspects of the disclosure relate to a unit, system and a method that allows separation of a physical network layer, and where transport and radio resources can be configured, managed, and upgraded, from the service layer. The service layer allows customers and tenants to use these resources agnostically to the network. The network layer may be considered as a radio plus transport layer. Aspects of the disclosure allow multiple tenants to efficiently use vendor specific network equipment.

Figure 1:
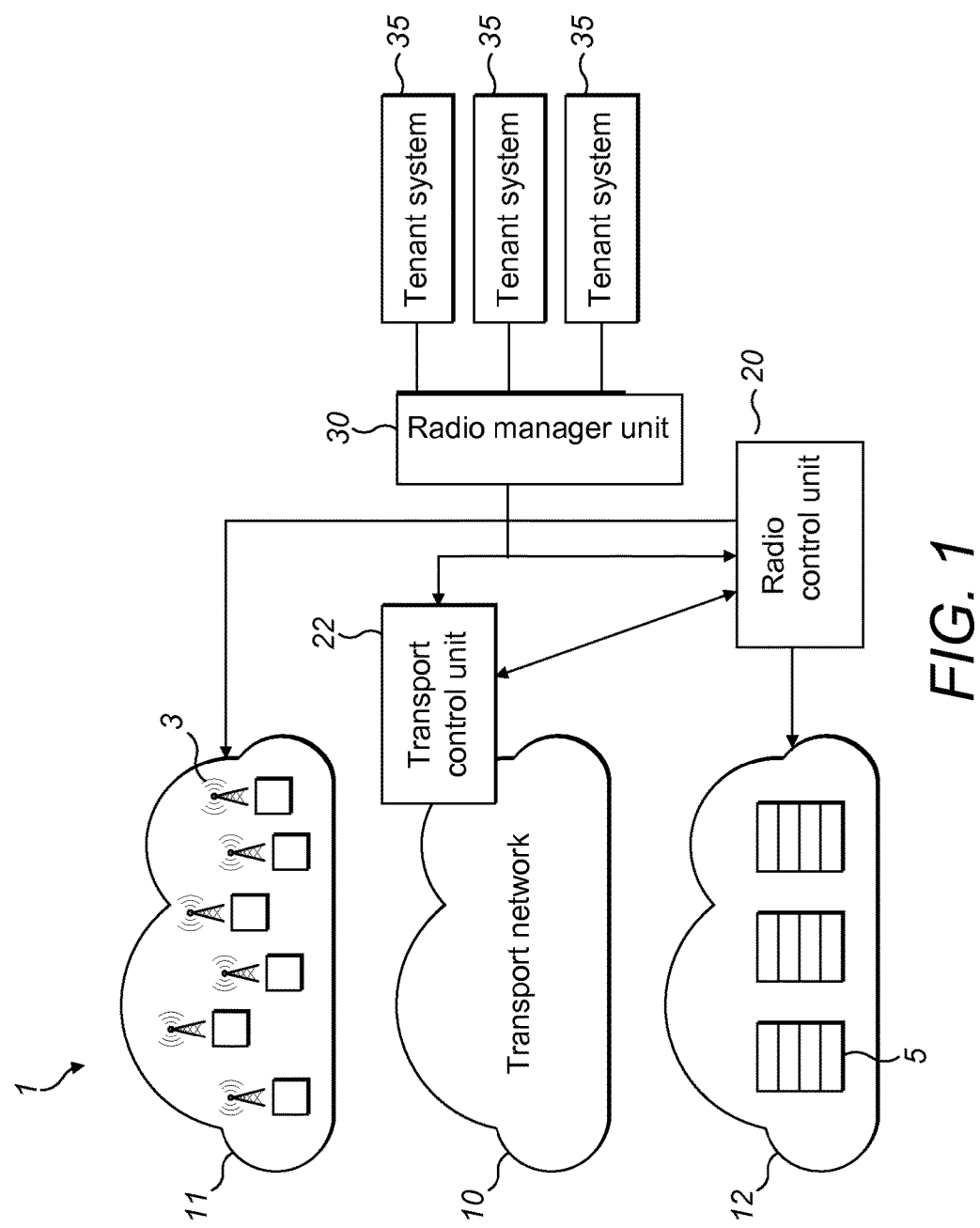
FIG. 1 is a schematic overview depicting a system according to an example of the disclosure.

FIG. 1 shows an example physical representation of a network 1, configured to be used by a plurality of tenants. The network 1 may be considered as a (or a part of a) radio access network. The network 1 may be considered as a fronthaul network.

The network 1 comprises one or more RRUs 3. The RRUs may optionally be considered as forming a RRU cloud 11. The RRUs may be arranged in one or more RRU clusters.

The network 1 further comprises one or more DUs 5. The DUs may optionally be considered as forming a DU cloud 12 or DU pool. A term 'baseband processing unit' may refer to a DU or a DU pool in which baseband processing is carried for one or more RRU. The DUs 5 may be considered as located in a baseband hotel.

In some examples, the RRU may alternatively be termed Radio Equipment (RE). In some examples, the DU may alternatively be termed a Main unit (MU), Radio Equipment Controller (REC) or Baseband Unit (BBU).

The RRUs 3 and DUs 5 are arranged to be controlled by a radio control unit 20. The radio control unit 20 is, for example, one or more conventional control entity configured to handle DU and RRU resources. In some examples, the radio control unit 20 provides for radio cooperation. For example, the radio control unit 20 is implemented by a Mobility Management Entity (MME).

The network 1 is configured to connect the one or more RRUs with the one or DU. The network 1 further comprises a transport network 10. In some examples, the transport network 10 is an optical network, i.e. using optical connections to connect the RRUs and DUs. In some aspects, the transport network 10 may be considered as connecting the RRU cloud 11 and DU cloud 12. The transport network 10 is arranged to be controlled by a transport control unit 22.

In some examples, the transport network 10 comprises one or more switches to route data (e.g. CPRI radio data) between a RRU 3 and DU 5. The switches may be optical and/or electronic switches. Such switches may be located at the site of the RRUs, at the site of the DUs 5, and/or intermediate sites. Such switches are controlled by the transport control unit 22.

In some examples, the transport network 10 provides for bandwidth between a RRU 3 and a DU 5 to be assigned with a controllable granularity (e.g. from A×C to wavelength). The transport control unit 22 is configured to carry out path computation between the RRU 3 and DU 5. For example, the transport control unit 22 is configured to run one or more path calculation algorithms, for example, according to some policy and constraints or optimization objectives. In some aspects, the transport control unit 22 may be considered as configuring transport aspects of the fronthaul network. The transport control unit 22 may also be configured to handle recovery events, for example, in the event of a link or equipment failure.

In some examples, the transport control unit 22 is implemented in a card in the same site of the DU pool 12 or as a remote application with the radio control unit 20 (e.g. as an application interworking with the MME). According to the specific solution adopted, a protocol is provided to allow the communication between the radio control unit 20, transport control unit 22, and optical fronthaul nodes (e.g. RRUs, DUs, and switches of the transport network 10).

The network 1 further comprises a radio manager unit 30. The radio manager unit 30 is configured to control or trigger both RRUs 3 and DUs 5 and the transport network 10. The radio manager unit 30 is connected to the radio control unit 20 and transport control unit 22 to control these respective resources. The radio manager unit 30, radio control unit 20 and transport control unit 22 may be considered as forming a system or control system for the network.

The radio manager unit 30 is connected to one or more tenant systems 35, also referred to as tenants, client systems or clients. The tenant is aware only of the topology (using tenant system 35) defined for the tenant. The transmission of data will be performed on the physical resources (i.e. portion of DU, RRU and transport network), but the tenant is not aware about the specific details of how the data is transmitted. The separation between resource (radio and transport) and services allows separation of the responsibility and ownership between infrastructure and services.

The radio manager unit 30 is configured to operate according to one or more defined constraints and policy. In some aspects, the radio manager unit 30 is configured to communicate with a said tenant system based on abstracted or virtualized information of the transport network and the baseband processing unit. The radio manager unit 30 is configured to organize the resources for the virtualized view. In some aspects, the radio manager unit 30 receives a request, or transmits information based on the abstracted view of the transport and radio resources of the network 1. The radio and transport physical resources are organized in abstracted (i.e. summarized) resources and exposed to tenant (clients, operators) according to the type of contract supported. In some examples, the radio manager unit generates the abstracted view based on the information and the operations performed by radio and transport. For example, the abstracted view is generated based on information received from the radio control unit 20 and transport control unit 22.

The radio manager unit 30 allows the tenant to be efficiently allocated resources in a fronthaul transport network and baseband processing resources. The resources allocated are shared with independent tenants.

In some aspects, the radio manager unit 30 assigns an abstracted resource to a tenant. As such, the radio manager unit 30 communicates with the tenant on the basis of virtualized resources. Such abstracted resources may alternatively be considered as virtualized or summarized resources. The abstracted resources do not include all the details of the actual physical resources available, but provide a high level summary or overview of the resources. For example, in the transport network, a summarized parameter (e.g. bandwidth) between two points is provided, indicating the total parameter (e.g. bandwidth) for traffic between the two points by any route, and possibly using multiple links and switches. The parameters of each individual element is not provided in the summarized information. For example, for a DU, the summarized resources may indicate the total baseband processing capacity of a plurality of DUs, without specifying the capacity of an individual DU.

In some examples, the radio manager unit 30 communicates with the radio control unit 20 and transport control unit 22 on the basis of virtualized resources or physical resources. The radio control unit 20 and transport control unit 22 are configured to control their respective physical resources. The identification of the physical resources on the basis of the virtualized resources is carried out in the radio control unit 20 and transport control unit 22 or in the radio manager unit 30. The radio manager unit operates on the abstracted view of the resources. In general the radio manager unit is aware only of a subset of physical resources, especially for the transport resources where it is not necessary for the radio manager unit to have a detailed knowledge of all physical resources. Thus, in some aspects the radio manager unit communicates with the radio control unit and transport control unit by using the abstracted resources.

In some aspects, the radio manager unit 30 is configured to handle requests from tenants, i.e. a customer or client. As such the radio manager unit 30 agrees and coordinates the requested service.

In some aspects, the radio manager unit 30 dynamically interworks with the tenant system 35 (i.e. customer/client). This interworking may be to enable new types of services for which the resources of the network 1 can be requested on-demand and negotiated. In this example, the radio manager unit 30 functions as a broker of services to a tenant (customer), or plurality of tenants. The radio manager unit 30 is configured to provide for an organization of the fronthaul network resources and the radio resources in two layers, i.e. transport and radio. The layers can change or evolve independently. The radio manager unit 30 allows interworking between the layers in order to represent a virtualized view towards the clients.

Figure 2:
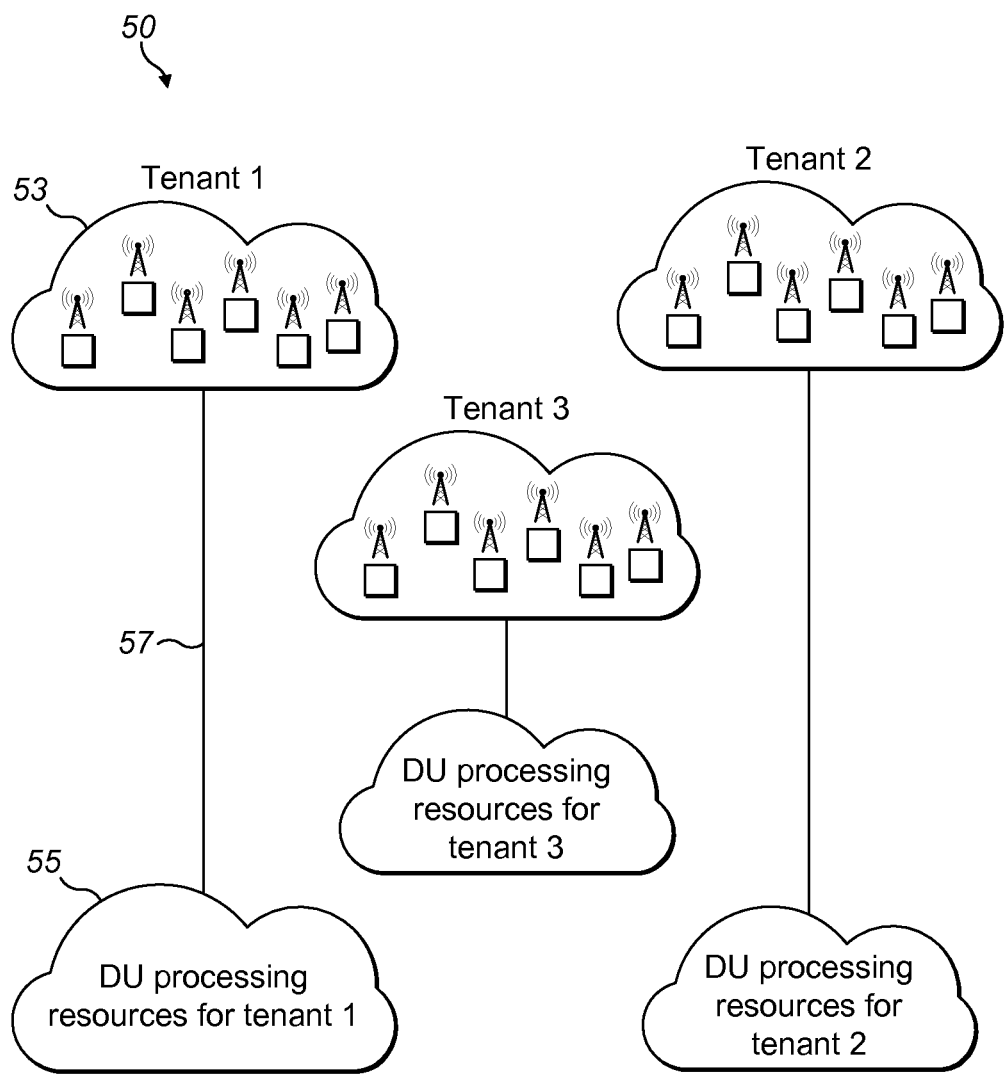
FIG. 2 is a schematic overview according to a further aspect of the disclosure.

FIG. 2 shows an illustration indicating a virtualized view 50 provided to the tenant systems 35. The radio manager unit 30 is configured to provide for Tenant 1 a virtualized view of DU resources 55, and a virtualized view of the transport network connection 57 between the RRU resources 53 and DU resources 55. In some examples, a virtualized or summarized view of RRU resources 53 is also provided. Corresponding virtualized views are provided for one or more further tenant systems 35, in this example, for tenant 2 and tenant 3.

The network 1, including the radio manager unit 30, is configured to use information of the physical infrastructure to provide a simplified and virtual view of the network. This virtualized view can be partitioned and exposed to different tenants/clients, as indicated by FIG. 2.

The provision by the radio manager unit 30 of a plurality of independent virtualized sets of information of the transport network 10 and the radio resources (RRUs and DUs). This allows the tenant systems 35 to independently access the fronthaul network. Thus, the radio manager unit 30 provides for an opening of the fronthaul network. The opened fronthaul network may be used in a "regulated region", where an authority requests the network is opened to multiple operators (tenants). A similar use can arise in a non-regulation example, allowing the owner of infrastructure to lease the network to several customers (tenants). The arrangement and functionality of the radio manager unit 30 allows the fronthaul network to be accessed by separate and independent tenants. In some examples, the tenant system provides one or more criteria to the radio manager unit, providing a constraint on the resources which can be allocated to the tenant.

The radio manager unit 30 can be implemented as an application of the radio control unit 20 and/or in a management system.

The Radio manager unit 30 functions as a transport network provider. The radio manager unit 30 exposes to each tenant a virtualized view of the resources that each tenant can utilize, allowing the physical resources to be organized as shown. The radio manager unit 30 is configured to provide the virtual view shown in FIG. 2. In some aspects, there is no immediate correspondence between physical and logical, virtualized, resources. In some aspects, the radio manager unit 30 (transport provider) may also be considered as one of the tenants.

The network arrangement described allows separation of the infrastructure from services. This allows an infrastructure provider to provide (e.g. lease) infrastructure to several tenants/customers/clients. The infrastructure provider can be the owner of both transport and radio, or there may be different owners for the radio and transport parts of the network. The radio manager unit allows such an independent operation of one or more the radio part, transport part and tenants.

In some examples, the transport control unit 22 (which may be considered as infrastructure provider) is configured to assign transport resources to each tenant. The transport resources assigned may be a wavelength (lambda), e.g. an optical channel as an assigned wavelength (e.g. 2.5 Gb/s, 10 Gb/s). Alternatively, the assigned transport resource may be a CPRI flow or other sub-wavelength unit for transporting radio data. The data transported may be radio data (e.g. I/Q data, using CPRI). The data transported may be packet data, e.g. data for backhaul or X2 communication between base stations (e.g. using Ethernet).

In the example where the transport resource is less than a lambda, one lambda may be assigned to different tenants, to transport data for the different tenants. According to its policy, a tenant can request to limit or exclude the situation where a wavelength is shared with another tenant. The radio manager unit 30 and/or transport control unit 22 is configured to assign resources according to such a request or constraint from one of the plurality of tenants.

The radio manager unit 30 is configured to assign virtual resources to a tenant. In one example, each tenant requests a specified amount of units of a virtualized resource. The tenant is not aware of the physical resources which will be assigned. The radio manager unit 30 may agree this request. The radio manager unit 30 then instructs the actual provisioning of appropriate resources by the radio control unit 20 and/or transport control unit 22. In some examples, resources are assigned to the tenant statically. The resources are statically assigned to each tenant, and are guaranteed even if they are not used.

In a further example, resources are assigned to the tenant dynamically. In this example, the tenant requests a resource when needed by the tenant (i.e. on-demand). The radio manager unit 30 assigns the resources to each tenant according to actual availability, policy, or other criteria. The resources can only be assigned if they are available at the time of the request. This means that the resource assignment may or may not be fulfilled.

In a further example, resources are assigned to the tenant in a hybrid manner. For example, a part of the resources is assigned statically and guaranteed. A further part is assigned dynamically, and may be shared with the other tenants. Thus, a part only of the fulfillment of the request is not assured.

The network 1 is configured with a separation between the functions of the transport control unit, radio control unit and radio manager unit. This allows a change to a criteria received from the tenant system, e.g. to a policy, or a resource optimization algorithm, without impacting on all of the layers concurrently.

For example, a tenant wants to change a criteria of an administrative policy and requests to bound the resources shared with other customers. In some aspects, a tenant does not allow that its traffic shares the same physical resources with the traffic of another tenant The tenant request is received by the radio manager unit 30. The request can be met by reconfiguring the customer rule about the administrative constraints in the Radio manager unit 30, without any impact on the radio control unit and transport control unit. The same separation of function is applicable if a customer requires the modification of the amount of bandwidth that is guaranteed and the amount of bandwidth that is not guaranteed. This is performed by operating at a level of the radio manager unit, for example, at a virtualized level of the network. This does not impact on the other layers (transport and radio).

In a further example, new algorithms are defined for optimization of radio resources, e.g. cooperation, which requires some upgrade at the DU. This impacts the radio control unit or the DU, but it does not affect the functioning of the radio manager unit 30 or transport control unit.

In a further example, a new algorithm for transport optimization is implemented. In this case, only the transport control unit is upgraded. There is no impact on the other two layers (radio manager unit or radio control unit).

Aspects of the disclosure relate to requesting, negotiating, finding and configuring resources (both radio and optical network resources) to meet a request coming from a tenant/client to the radio manager unit 30 in charge of handling/managing the radio resources. The request from the client/tenant to the Radio manager unit 30 may be performed by means of a protocol selected according to the implementation.

The procedure enables a new class of services where, dynamically, the tenant (i.e. customer) is able to request, negotiate and receive services using the radio manager unit 30.

Figure 3:
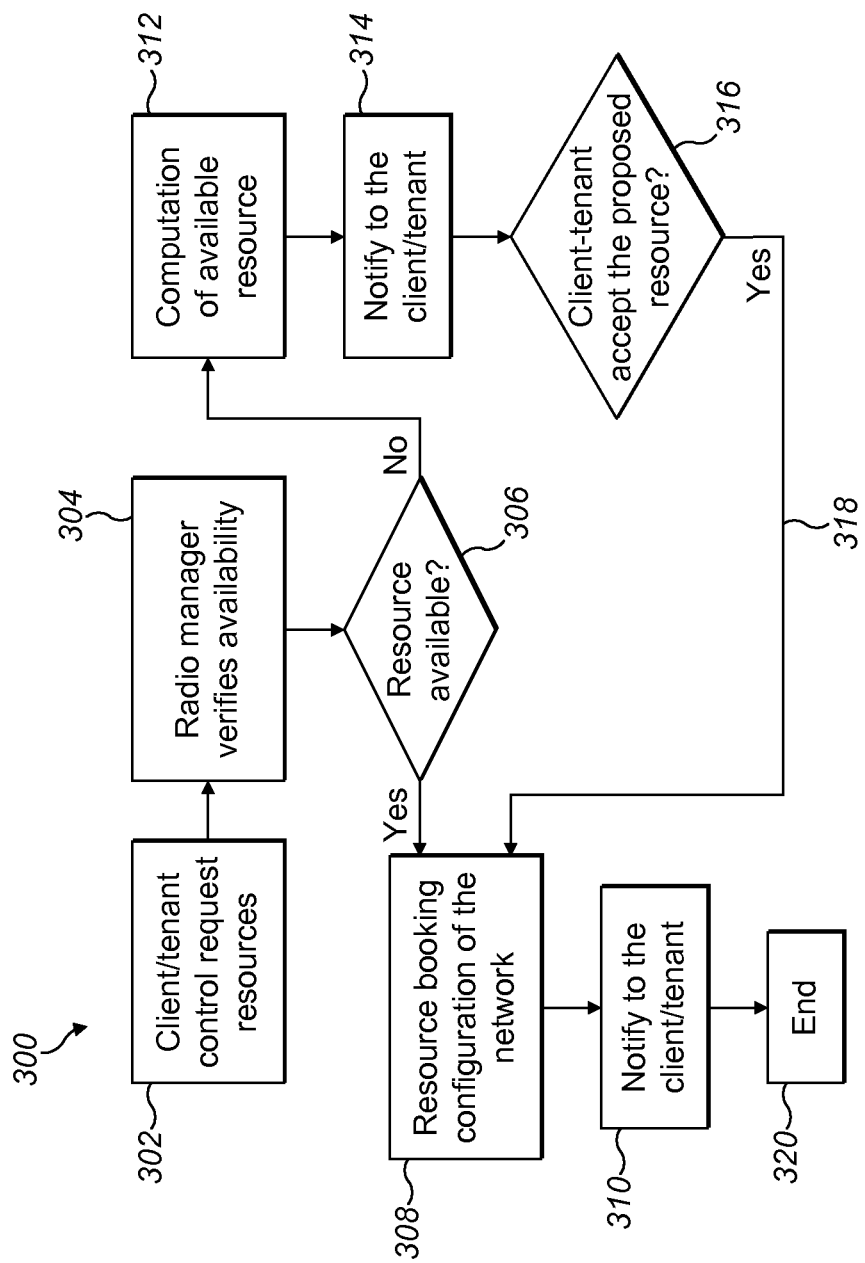
FIG. 3 is a flowchart illustrating an example method of an aspect of the disclosure.

FIG. 3 shows an example method 300 to request and assign resources.

In 302, the tenant requests resources using the tenant system 35. A request is made to the radio manager unit 30.

In 304, the radio manager unit 30 receives and processes the request from the tenant system 35. The radio manager unit 30 verifies the availability of the resources to meet the request. The resources may be radio resources (e.g. provided by a DU and/or RRU) and/or transport resources between a RRU and DU (e.g. provided by an optical transport network). The radio manager unit 30 may verify the availability by requesting information on available resources from the radio control unit 20 and/or transport control unit 22, or from information on available stored in or accessible directly by the radio manager unit 30.

As such, the radio manager unit 30 may operate by itself or can require communication to the radio and transport control.

Figure 4:
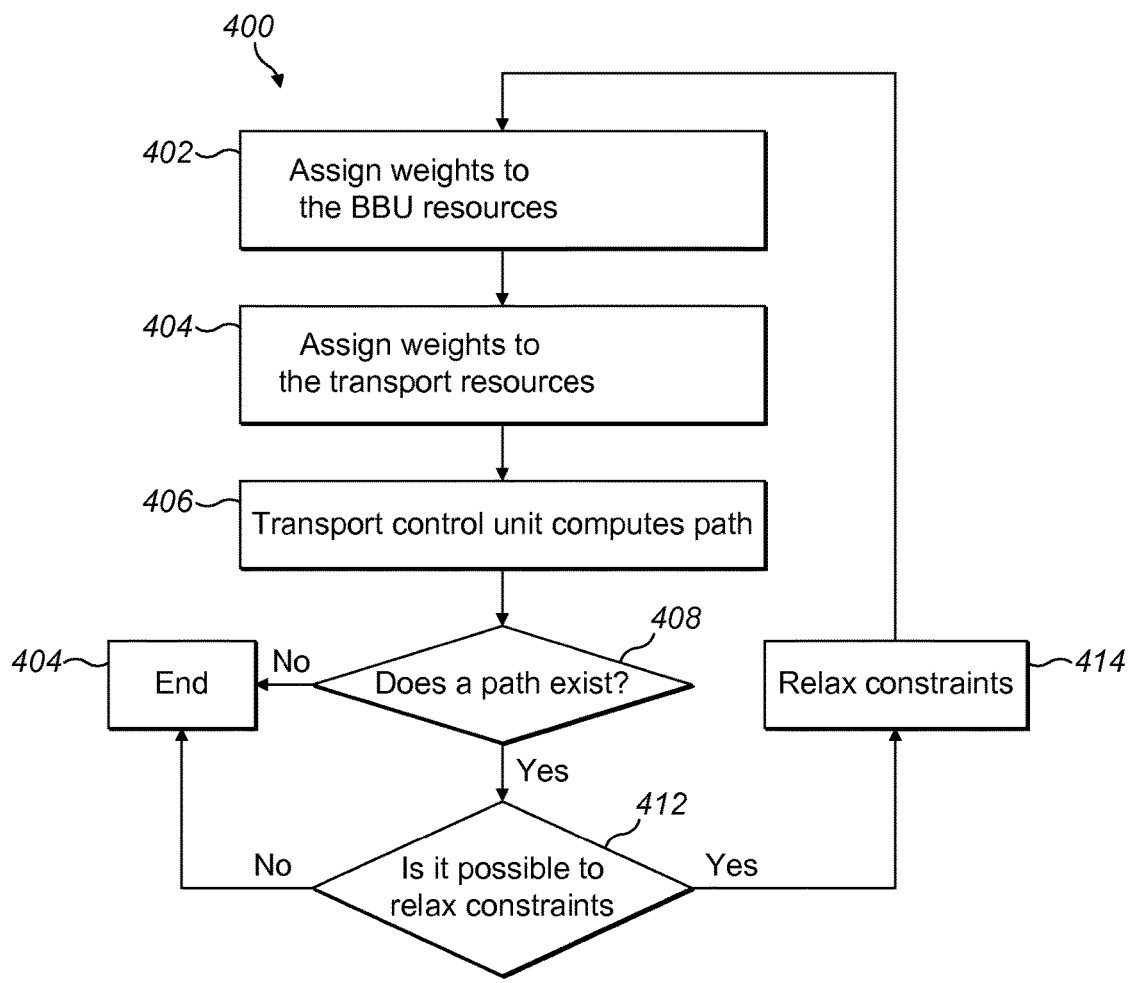
FIG. 4 is a flowchart illustrating an example method of a further aspect of the disclosure.

In some examples, FIG. 4 provides additional details of the step 304. The step 304 may include the option to relax the constraints of the request. In this case there is a further interaction between radio manager unit and transport control unit to accept if the constraints can be relaxed. The acceptance of the relaxed constraints may be done by the radio manager unit only or the radio manager unit may interact with the tenant(s) and request confirmation that the relaxed constraints/requirement are acceptable.

In some examples, the radio control unit and transport control unit may move or pre-empt traffic and provide a different mapping of the traffic on the resources (e.g. different routing) that allows meeting of the request. Interaction between the radio manager unit and transport control unit (and/or radio control unit) to propose to move/pre-empt some traffic and the radio manager can provides for a determination of whether or not to do such operation in order to accept the new service request.

In 306, the radio manager unit 30 makes a determination of whether the requested resources are available. In some examples, the radio manager unit 30 requests the radio control unit 20 and/or transport control unit 22 to provide a determination of whether the radio resources and transport resources are respectively available, and uses those determinations as an input to determine if the tenant request can be met.

In 308, the determination is that the requested resources are available (i.e. yes). In this case, the radio manager unit 30 communicates with the radio control unit 20 and transport control unit 22 to arrange and book the resources, and configure the network according to the tenant request.

In 310, the radio manager unit 30 notifies the tenant (i.e. with a communication to the tenant system) that the request is accepted and the resources have been made available In 312, the determination is that the requested resources are not fully available (i.e. no). A computation is made of the available resource, e.g. by the transport control unit, transport control unit and/or radio manager unit 30.

In 314, the radio manager unit 30 communicates the resources which are available to the tenant system 35, to form the basis of a modified request. Alternatively, the radio manager unit 30 receives a modified request from the tenant system 35.

In 316, the tenant makes a determination on whether the available resources, although less than originally requested, are acceptable. The determination, for example, in the form of a modified request, is received by the radio manager unit 30.

In 318, the tenant accepts the proposed resources, e.g. with a message from the tenant system 35 to the radio manager unit 30. If the tenant does not accept the proposed resources, the process ends.

If the tenant accepts the proposed resources, the method then proceeds with the step 308, with the accepted resources being booked and the network configured according to the accepted resources. As above, in 310, the tenant system 35 is notified that the resources are assigned and the network configured.

The method 300 ends at 320, since the requested resources have now been allocated.

FIG. 4 shows an example method 400, which may be considered as providing further details of the 'request procedure', e.g. shown in step 304 of FIG. 3. The method 400 aims at verifying the availability of resources.

In 402, the radio control unit or radio manager unit assigns weights based on one or more parameters of the radio resources (e.g. baseband processing resources). The weights are assigned for one or more of radio requirements (e.g. coordination requirements between base stations/RRUs), energy consumption, and/or administrative constraints. For example an administrative constraint may be a request from a tenant not to share physical resources with another tenant.

The weight assignment is an optional method related to a search for resource availability. In order to provide a best optimization it may be useful to represent both radio and transport resources according to a homogenous representation. To implement such a single representation of both radio and transport resources, "weights" are assigned based on a resource parameter of radio and/or transport resources. This provides for objectives in the optimization to be defined. In some aspects, the weight is a parameter of a radio and/or transport resource. The weight or parameter is used as a basis of comparison of resources to allocate the optimal resources e.g. the resources associated with the 'best' value of the parameter.

The optimization method may be applied to a set of resources that include both radio and transport. For example, the radio and/or transport networks may be configured according to an objective to reduce power consumption of DU processing. The power consumption of DU processing is then used as a weight, to optimize the selected radio and/or transport resources according to that objective, and to meet the tenant's request. In some examples, optimization of two or more parameters or features may be the objective. In some aspects, the parameters are scaled or weighted accordingly, corresponding to the objective. The weight allocating to a resource parameter allows a defining of which is the objective(s) to be considered and provides for optimization according to such objective(s), for radio and transport resources concurrently.

In a further example, a determination is made to optimize DU occupancy. The weight could be based on the ratio between the total amount processing and available amount of processing. This allows a comparison between the weights. The system and method is arranged to assign weights to radio and transport in order to allow cross optimization.

In 404, the transport control unit or radio manager unit assigns weights to the transport resources. The transport resources may relate to physical links. The weights are assigned considering radio input (e.g. transmission requirements), energy consumption, and/or administrative constraints (e.g. a tenant request not to share physical resources with another tenant).

In 406, the transport control unit computes a path in the transport network to handle the tenant request. The path may be an optimal path through the transport network to meet the requirements. The path is calculated based on the weighted topology. In some aspects, the path selected is determined at least partially on one or more parameters (weights) of the transport and/or radio resources associated with the path.

In some aspects, the radio control unit assigns weights, and the transport control unit assigns weights and optimizes the path computation taking into account the weights from both the transport network and the weights from the radio resources.

Alternatively, the radio control unit assigns weights, and the transport control unit assigns weights to the transport resources and provides an abstraction view of the transport resources with weights to the radio manager unit 30. The radio manager unit 30 then performs the optimization of the path considering both radio and transport weights.

In 408, a determination is made on whether a path exists which meets the transport (and radio requirements). For example, the determination is made by the transport control unit 22 or the radio manager unit 30.

If the path does exist (i.e. yes), the method 400 ends at 410. The calculated path is used in the method 300 described in FIG. 3.

If the path does not exist, i.e. there is no availability of resources, the method proceeds at step 412. The radio manager unit 30 determines whether it is possible to re-negotiate the constraints with the tenant, in order to reduce or eliminate one or more constraints. By relaxing a constraint, the radio manager unit 30 may be able to determine radio and transport resources which can be provided to the tenant. Such constraints or criteria may be administrative or set by the operator policy.

If it is possible to relax the constraints, the constraints are relaxed in step 414. The method then repeats from step 402, on the basis of the changed request.

Aspects of the disclosure provide a multi-tenant solution for a fronthaul network. The fronthaul network includes RRUs (e.g. arranged in clusters), one or more DUs and a WDM optical network connecting the RRUs and DUs. The solution is arranged to provide a virtualized and abstract view to each tenant. The virtualized view is agnostic to the physical network and independent of vendor specific equipment. The radio manager unit provides for a segregation of tenants' resources and policies. The radio manager unit 30 is configured to broker services to the tenants, for example on demand.

The radio manager unit 30 is configured to operate as a bandwidth/service broker for the tenants (for example operators). This allows the tenants to dynamically request a service or negotiate the service. This is considered to be a new function for the radio access network. The system utilizes an interface with the tenant systems. In some examples, the interface is an extension of an existing interface used in a different network scenario (e.g. User-Network Interface (UNI) or may be a specific interface for this function.

The system described is configured to provide resource abstraction working directly on level (Layer) 1. For example, the resources are considered at a CPRI/subwavelength layer. The virtualized (or abstracted) information relates to an optical and/or CPRI level. As such, this may be referred to as level 1+.

The network (i.e. the radio manager unit 30) is configured to concurrently consider radio and transport requirements and constraints, and optionally, the tenants' (e.g. operators) criteria, e.g. a policy or SLA. Thus, the radio manager unit 30 is configured to assign resources based on both radio and transport resources, and optionally on a tenant's criteria. The assigned radio and transport resources are provided to one of a plurality of independent tenant systems. The radio manager unit 30 communicates with the tenant system on the basis of abstracted (i.e. virtualized) transport and radio resources.

The described method and system concurrently provides for an efficient usage of the transport resources and the satisfaction of radio constraints. The method allows separating the operation performed at transport and radio layer from the abstracted (virtual) representation of the resources to the tenants (e.g. operators/customers).

The described system architecture defines clear demarcation points among the radio and control in order to simplify Operations, administration and management (OAM) functions. For example, the arrangement allows the separation of the implementation of the radio and transport equipment.

The method and the architecture define a solution which can be based on current customized hardware for radio and transport nodes. The arrangement described does not require a full Software Defined Network (SDN). Instead, the system provides a centralized system, with virtualization and layer separation between radio, transport and services. The system is able to use vendor specific hardware.

Some aspects provide an abstraction or virtualization capability to expose point-to-point connections and radio resources to tenants (customers). The abstracted information is provided in a transparent manner, i.e. independent of the physical resources are physically provided, connected and/or the technology used. The abstracted communication (e.g. request, offer or acceptance between the radio manager unit and tenant system) may be provided dynamically. The system provides for complete separation between the service layer, i.e. the layer exposed to the tenants (customers/client) and transport layer. This transport layer may be considered as a combination of radio and transport resources. In some aspects, the method and system provides for performing the request from the tenant (customer) on demand and in some case, to re-negotiate the request.

The described CRAN arrangement provides support for a multi-tenant scenario through virtualization, avoiding over-provisioning of bandwidth resources and network infrastructure. In this example, the transport infrastructure for the mobile access network is able to deliver an improved service (e.g. to more tenants/customers), in configuring their mobile connectivity.

Aspects of the disclosure further provide for dynamic association of the connectivity resources in the transport network and between DUs and RRUs. These connectivity resources may be reconfigured according to the provider policy, the operator policy or a radio procedure optimization (e.g. for radio coordination or energy saving.).

Aspects of the disclosure further provide a capability to handle concurrently and dynamically different granularity of bandwidth of radio data, e.g. as CPRI transmissions in the transport network. In some examples, the bandwidth handled (e.g. switched) is from A×C to lambda.

Figure 5:
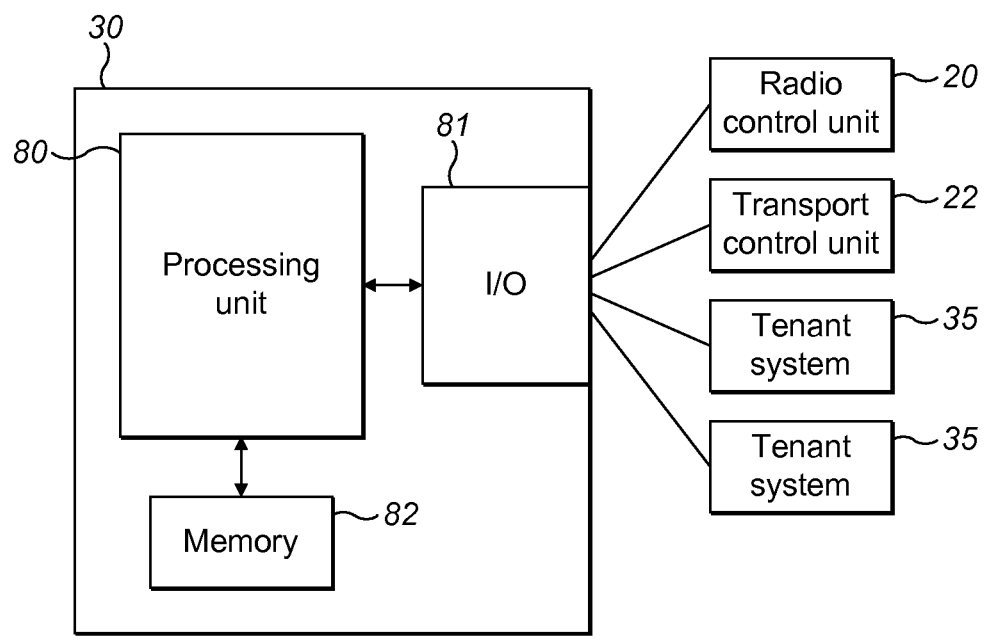
FIG. 5 is a schematic drawing of an aspect of the disclosure.

FIG. 5 shows an example implementation of the radio manager unit 30. The radio manager unit 30 comprises a processing circuit 80, together with computer program code for performing the functions and/or method steps of the embodiments herein. An input/output unit 81 is connected to the processing unit in order to communicate with the radio control unit 20, transport control unit 22 and one or more tenant systems 35. A memory 82 is also connected to the processing circuit 80, for operation of the processing circuit 80 and/or storing the current configuration of the switch system and any other parameters or data needed.

In some aspects, the radio manager unit 30 is a logical entity. The hardware features described may be particular to the radio manager unit 30, or shared with one or more other logical entities. In some examples, the radio manager unit 30 is implemented with different functional blocks, such as a processing circuit/unit, database, memory, and interfaces towards an upper layer that is the tenant system 35, and interfaces towards the tenant systems and the radio and transport resources (i.e. control units). The radio manager unit 30 has a suitable protocol to interwork with the tenants on demand. The implementation to do so may be based on an SDN framework. In some aspects, the radio manager unit 30 may be implemented as an application within a Network Management System (NMS).

The program code mentioned above may also be provided as a computer program product, for instance in the form of a data carrier carrying computer program code for performing embodiments herein when being loaded into the radio manager unit 30. One such carrier may be in the form of a CD ROM disc. It is however feasible with other data carriers such as a memory stick. The computer program code may furthermore be provided as pure program code on a server and downloaded to the radio manager unit 30. Any unit or element described may be considered as a logical unit or element, for example implemented as software, hardware and/or firmware as part of a larger entity. In some aspects, the radio control unit 20 and/or transport control unit 22 is a logical entity, and/or implemented using any of the features or elements described above for the radio manager unit 30.

Aspects of the disclosure define a method, architecture and functional building blocks to provide multi-tenant support in an optical fronthaul network. In some examples, the optical fronthaul network operates at a wavelength level (i.e. data switched in wavelengths), and/or at a sub-wavelength level. These aspects provide for the organization of the resources (RRUs and processing bandwidth assignment in the DU) to allow each tenant to own a certain share of them. Aspects of the disclosure provide for the dynamic assignment of these network resources to optimize their usage. The assignment may avoid excessive overprovisioning or bandwidth reservation. Aspects of the disclosure further provide for automatically requesting, negotiating and assignment of the transport and radio resources, for example, according to tenant policy and/or resource availability.

Aspects of the disclosure define a layering of the fronthaul network in:

a) a service layer that is the abstracted (virtualized) view exposed towards the tenant (client) of the connectivity resources between the RRUs and the DUs;

b) a network layer that is the actual physical connectivity that allows RRUs to be dynamically connected to the DUs.

The layering may be considered as a separation of virtualized and physical resources, e.g. a separation of a service layer and an infrastructure layer.

Aspects of the disclosure describe a radio manager unit is configured to expose an abstracted view to each tenant of the amount of resource that can be used. The tenant can therefore obtain and operate on the abstracted view. In some aspects, the radio manager unit receives a request for resources based on the abstracted view, and accepts or does not accept that request.

The architecture described includes a radio manager unit in charge of organizing the resources among multiple tenants, and in communication with a radio control unit and transport control unit.

The system and method provides for the optimizing of the use of the network fronthaul resource. In some examples, this allows a reduction in the network cost. The system and method provides for dynamically negotiating and assigning the resources with the tenant. The control will act according to a certain policy to organize the virtualization of the resources and their assignment to each tenant.

This arrangement provides for multi-tenant support, using vendor specific equipment. This enables multiple operators to share the same fronthaul network on existing infrastructure. Independent optimization and upgrade of transport and radio resources is possible. In some aspects, the Radio manager acts as a broker of bandwidth, provided dynamically to the tenant.

In some aspects, the network is configured to allow end users (i.e. UE users) to request, and negotiate on demand, the bandwidth for any new service. This allows the UE user to enable any tenant (operator), e.g. select the most preferred operator.

Aspects of the disclosure provide for communicating connectivity resources by means of an abstracted (virtualized) view individually configured for each tenant (client) that allows the tenant, via the radio manager unit, to act on the radio resources transparently without knowledge of the transport layer.

The network provides for separation and independence of connectivity (i.e. transport network) and radio services (e.g. baseband processing) to automate and simplify the process to assign the connectivity resources to different tenants, without impacting on the radio processing hardware.

The network is compatible with multiple tenants in a C-RAN solution, even in the presence of vendor specific hardware and radio control software.

The network has the capability to set up new services relying on the fact that connectivity between RRU and DU, and BBU processing resources can be assigned on demand. This requires the ability to expose the resources in a suitable way for each tenant and organize resources and connectivity assignment to different operators or clients dynamically and according to their needs.

The invention claimed is:

1. A radio manager unit for a radio access network, wherein the radio manager unit is configured to connect to a transport control unit configured to control a transport network between a baseband processing unit and a plurality of remote radio units;
   wherein the radio manager unit is further configured to connect to a radio control unit configured to control the baseband processing unit,
   wherein the radio manager unit is further configured to be connected to one or more tenant system of a tenant, and
   the radio manager unit is configured to arrange for resources of the transport network and resources of the baseband processing unit to be configured for use by a said tenant.

2. The radio manager unit as claimed in claim 1 wherein the radio manager unit is configured to communicate with a said tenant system based on abstracted information of the transport network and the baseband processing unit.

3. The radio manager unit as claimed in claim 1 wherein the radio manager unit is configured to independently communicate with each of a plurality of tenant systems.

4. The radio manager unit as claimed in claim 1 wherein the radio manager unit is configured to arrange for resources of the transport network and resources of the baseband processing unit according to one or more criteria received from a said tenant system.

5. The radio manager unit as claimed in claim 1 wherein the radio manager unit is configured to receive an on-demand request of service from a said tenant system, and communicate with the tenant system to accept the request or a modified request, and provide the request or modified request to the radio control unit and/or transport control unit for at least part of the resources of the transport network and resources of the baseband processing unit to be configured for use by the said tenant.

6. The radio manager unit as claimed in claim 1 wherein the radio manager is configured to receive requested resources of the transport network and resources of the baseband processing unit from the tenant system, and configured to verify if said resources are available.

7. A system for a radio access network, the system comprising:
   a transport control unit configured to control a transport network between a baseband processing unit and a plurality of remote radio units;
   a radio control unit configured to control the baseband processing unit,
   a radio manager unit connected to the transport control unit and radio control unit, and
   wherein the radio manager unit is configured to be connected to one or more tenant system of a tenant, and
   the radio manager unit is configured to arrange for resources of the transport network and resources of the baseband processing unit to be configured for use by a said tenant.

8. The system as claimed in claim 7 comprising the radio manager unit as claimed in any one of the preceding claims.

9. The system as claimed in claim 1 wherein the system is configured to assign a weight to one or more resources of the transport network and/or resources of the baseband processing unit, and determine a path in the transport network according to the weighted resources.

10. The system as claimed in claim 1 wherein the transport network is an optical transport network, and optionally, the optical transport network is a wavelength division multiplexed, WDM, optical transport network.

11. A method for a radio manager unit in a radio access network, comprising:
    communicating with a tenant system of a tenant to determine resources of a transport network and/or resources of a baseband processing unit for use by the tenant;
    communicating with a transport control unit controlling a transport network between a baseband processing unit and a plurality of remote radio units; wherein the communicating with a radio control unit controlling a baseband processing unit,
    wherein the communicating with the transport control unit and the radio control unit arranges for the determined resources of the transport network and the baseband processing unit to be configured for use by the said tenant.

12. The method as claimed in claim 11 wherein the radio manager communicates with a said tenant system based on abstracted information of the transport network and the baseband processing unit.

13. The method as claimed in claim 11 wherein the radio manager unit independently communicates with each of a plurality of tenant systems.

14. The method as claimed in claim 11 comprising arranging for resources of the transport network and resources of the baseband processing unit according to one or more criteria received from a said tenant system.

15. The method as claimed in claim 11 wherein the radio manager unit receives an on-demand request of service from a said tenant system, and communicates with the tenant system to accept the request or a modified request, and provides the request or modified request to the radio control unit and/or transport control unit for at least part of the resources of the transport network and resources of the baseband processing unit to be configured for use by the said tenant.

16. The method as claimed in claim 11 wherein the radio manager unit receives requested resources of the transport network and resources of the baseband processing unit from the tenant system, and verifies if said resources are available.

17. The method as claimed in claim 11 comprising assigning a weight to one or more resources of the transport network and/or resources of the baseband processing unit in the radio manager unit, radio control unit and/or transport unit, and determine a path in the transport network according to the weighted resources.

18. A computer program product configured to implement the method described in claim 11.

* * * * *